J. KARITZKY.
CONDUIT OR CABLE CLAMP AND BRIDLE RING.
APPLICATION FILED AUG. 17, 1920.
1,365,630.
Patented Jan. 11, 1921.
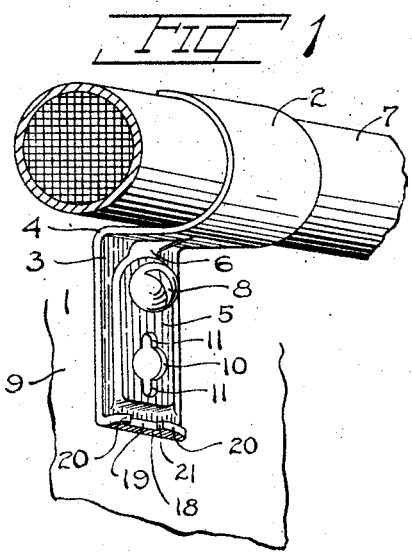
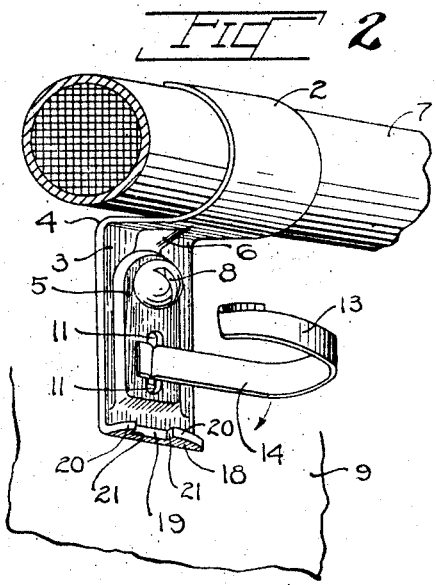
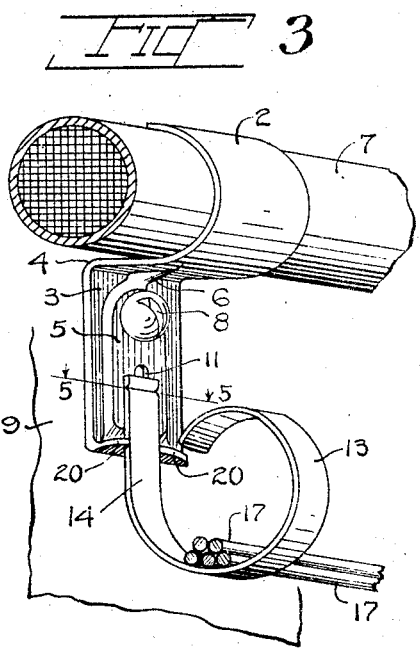
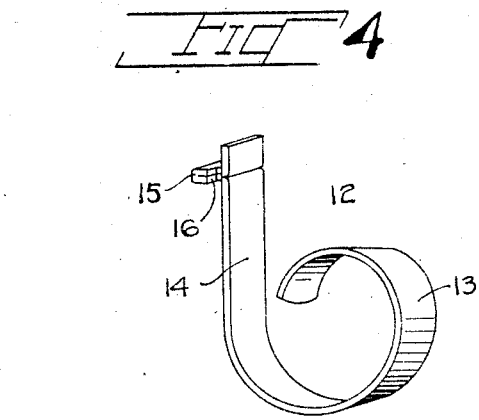
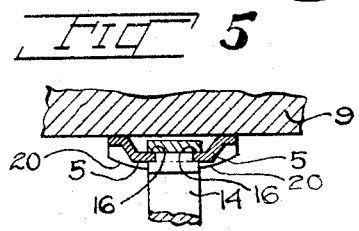
INVENTOR
John Karitzky
BY
Alan M Johnson
ATTORNEY

UNITED STATES PATENT OFFICE.

JOHN KARITZKY, OF GARWOOD, NEW JERSEY, ASSIGNOR TO HENRY B. NEWHALL, OF PLAINFIELD, NEW JERSEY, EXECUTOR OF HENRY B. NEWHALL, SR., DECEASED.

CONDUIT OR CABLE CLAMP AND BRIDLE-RING.

1,365,630.  Specification of Letters Patent.  Patented Jan. 11, 1921.

Application filed August 17, 1920. Serial No. 404,162.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a strong cable clamp which can be made of metal of the minimum thickness and weight. My invention further relates to providing the base of the clamp with a raised boss and preferably with a strengthening shoulder extending from the boss to the hook portion and serving to transmit through the boss a large part of the strains directly to the securing screw.

My invention further relates to such a conduit or cable clamp provided with means to securely hold one end of an open or pigtail bridle ring. My invention further relates to providing the boss with such means. My invention further relates to such a conduit or cable clamp provided preferably with additional means to engage the bridle ring at another point and to prevent it from rocking or pivoting on the clamp. My invention further relates to a conduit or cable clamp formed from sheet metal of minimum thickness and having the boss and the strengthening shoulder struck up from the base.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures in which I have shown one embodiment of my invention the same reference numerals refer to similar parts in the several figures.

Figure 1 is a perspective view of my conduit or cable clamp and of a cable which it supports;

Fig. 2 is a perspective view of the conduit or cable clamp shown in Fig. 1, with the addition of an open or pigtail bridle ring in the first position of attaching it to the clamp;

Fig. 3 is a perspective view, similar to Fig. 2, but showing the bridle ring in its operative position;

Fig. 4 is a perspective view of the preferred form of bridle ring;

Fig. 5 is a horizontal section on the line 5—5 of Fig. 3.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal.

The weakest portion of the clamp is the meeting surface 4 where the base 3 and hook portion 2 join each other. In my invention I provide a raised boss 5 extending above the surface 3 of the base and form it preferably by stamping it up from the base. At the same time I stamp up a strengthening shoulder 6, extending from the boss to the under surface of the hook portion 2. This strengthening shoulder serves to transmit a large portion of the strains, thrown upon the clamp by the cable 7, directly to the securing screw 8 through the boss 5.

I provide the boss 5 with means to coöperate and hold one end of an open bridle ring, commonly termed a pigtail bridle ring. I have shown by way of example one form of my invention, in which the boss is provided with the hole 10, having the vertical slots 11, 11.

Ordinarily the conduit or cable clamp 1 will, at first, be used without the addition of a bridle ring. When, however, it is desired to increase the capacity of the installation, without going to the expense of taking down the cable 7 and installing a larger one, it is merely necessary, by my invention, to secure an open bridle ring to the clamp and string one or more runs of bridle wires. I have shown by way of example a bridle ring 12, Fig. 4, formed from flat sheet metal having an open hook 13, and a shank 14. This shank is bent back on itself or crimped at 15 to form a locking shoulder, which is cut away at 16, 16.

When it is desired to string runs of bridle wires 17, 17, it is merely necessary and without loosening the securing screw 8 from the wall 9, to bring the bridle ring 12 into the position shown in Fig. 2, so that the shoulder 15 can become seated in the hole 10 and slots 11, 11. Then by swinging the bridle ring down into the position shown in Fig. 3, the cutaway portion 16, 16 will be brought beneath the surface of the boss 5 and will support the bridle ring, as shown in Figs. 3 and 5.

Preferably, though not necessarily, I employ additional means on the base 3 to coöperate with the shank 14 of the bridle ring to prevent its swinging or pivoting within the boss 5. I have shown by way of example the end of the base bent to form a flange 18, having a cutaway portion 19. Preferably, the flange is provided with beveled or inclined surfaces 20, 20, both of said surfaces reaching their greatest height at the slot 19. When the bridle ring is brought down from the position shown in Fig. 2 to the position in Fig. 3, the shank 14 will engage the nearest inclined or beveled surface 20 which will cause it to be put under slight tension so that as the shank passes the first beveled surface 20, it will spring into the cutaway portion 19 and be securely held therein.

Should it ever be desirable to remove the bridle ring 12 it is merely necessary to pull out on the hook 13, against the spring of the metal, until the shank 14 escapes the abutments 21, 21 when it can be brought up into the position shown in Fig. 2, and then withdrawn from the hole 10 and slots 11, 11.

The bridle ring can be attached and withdrawn with equal facility by bringing it on the other side of the clamp from that shown in Fig. 2.

It will be noted that my construction is very simple, that no tapping or screwthreading of my clamp is necessary or desirable and that no screw-threads are placed upon the bridle ring. This permits me to use comparatively thin sheet metal, the boss and strengthening shoulder serving to strengthen the clamp at its weakest point.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base, the base being provided with a boss raised above the surface of the base, the boss being provided with means to coöperate with a securing screw and with an open pigtail bridle ring.

2. A conduit or cable clamp provided with a hook portion and a base, the base being provided with a boss and with a strengthening shoulder extending from the boss to the hook portion both the boss and strengthening shoulder being raised above the surface of the base, the boss being provided with means to coöperate with a securing screw and with an open pigtail bridle ring.

3. A conduit or cable clamp provided with a hook portion and a base, the base being provided with a boss raised above the surface of the base, the boss being provided with means to coöperate with a securing screw and with one end of an open pigtail bridle ring, the base being provided with additional means to coöperate with the shank of a bridle ring.

4. A conduit or cable clamp provided with a hook portion and a base, the base being provided with a boss and with a strengthening shoulder extending from the boss to the hook portion both the boss and strengthening shoulder being raised above the surface of the base, the boss being provided with means to coöperate with a securing screw and with one end of an open pigtail bridle ring, the base being provided with additional means to coöperate with the shank of a bridle ring.

5. A conduit or cable clamp formed from sheet metal having a hook portion and a base, the base being provided with a struck up boss and strengthening shoulder extending from the boss to the under surface of the hook, the boss being provided with means to receive a securing screw and also provided with means to hold one end of an open pigtail bridle ring.

6. A conduit or cable clamp formed from sheet metal having a hook portion and a base, the base being provided with a struck up boss and strengthening shoulder extending from the boss to the under surface of the hook, the boss being provided with a hole to receive a securing screw and also provided with an irregular shaped slot to hold one end of an open pigtail bridle ring.

7. A conduit or cable clamp formed from sheet metal having a hook portion and a base, the base being provided with a struck up boss and strengthening shoulder extending from the boss to the under surface of the hook, the boss being provided with a hole to receive a securing screw and with locking surfaces to lock one end of an open bridle ring, the base being provided with a cutaway flange to engage the shank of a bridle ring.

8. A conduit or cable clamp formed from sheet metal having a hook portion and a base, the base being provided with a struck up boss and strengthening shoulder extending from the boss to the under surface of the hook, the boss being provided with a hole to receive a securing screw and with locking surfaces to lock one end of an open bridle ring, the base being provided with a cutaway flange having inclined or beveled surfaces to engage the shank of a bridle ring.

JOHN KARITZKY.

Witnesses:
F. W. KARITZKY,
EMIL BETZ.